(12) United States Patent
Hodgen

(10) Patent No.: US 7,721,836 B1
(45) Date of Patent: May 25, 2010

(54) FOUR-WHEEL VEHICLE WITH MOTORCYCLE BODY

(76) Inventor: Seth A. Hodgen, 312 Jackson Ave., Omro, WI (US) 54963

( * ) Notice: Subject to any disclaimer, the term of this patent is extended or adjusted under 35 U.S.C. 154(b) by 929 days.

(21) Appl. No.: 11/383,880

(22) Filed: May 17, 2006

(51) Int. Cl.
- B62K 13/06 (2006.01)
- B62K 5/04 (2006.01)
- B62K 11/00 (2006.01)
- B62D 61/12 (2006.01)

(52) U.S. Cl. .................. 180/209; 180/311; 180/21; 180/198; 280/210; 280/781

(58) Field of Classification Search .................. 180/298, 180/312, 208, 311, 209, 21, 198; 280/30, 280/124.103, 210, 311, 312, 781
See application file for complete search history.

(56) References Cited

U.S. PATENT DOCUMENTS

| 1,502,303 | A | 7/1924 | Gabke | |
|---|---|---|---|---|
| 1,758,957 | A | 5/1930 | McKay | |
| D191,586 | S | 10/1961 | Byrn et al. | |
| 4,217,970 | A | * 8/1980 | Chika | 180/298 |
| 4,351,410 | A | * 9/1982 | Townsend | 180/210 |
| 4,787,647 | A | 11/1988 | Oh | |
| 5,505,493 | A | 4/1996 | Camfield et al. | |
| 6,203,043 | B1 | 3/2001 | Lehman | |
| 2004/0046160 | A1 | * 3/2004 | Chamoun | 254/88 |

FOREIGN PATENT DOCUMENTS

WO  WO 2005037637 A1 * 4/2005

* cited by examiner

Primary Examiner—Ruth Ilan
Assistant Examiner—Keith Frisby
(74) Attorney, Agent, or Firm—Crossley Patent Law; Mark A. Crossley

(57) ABSTRACT

A four-wheeled vehicle with a motorcycle body that allows the motorcycle body to be fixedly attached to metallic frame that includes a quartet of tires. The vehicle includes a metallic frame that has four "off-road" type tires attached to it. The vehicle also includes a motorcycle body which is essentially a motorcycle with the two tires stripped off of the body. The motorcycle body can be fixedly attached to the frame of the vehicle and can be connected to the drive train of the vehicle, allowing the engine on the motorcycle body to manipulate the drive train of the vehicle into turning the rear axle of the vehicle, thereby propelling the vehicle.

9 Claims, 5 Drawing Sheets

FOUR-WHEEL VEHICLE WITH MOTORCYCLE BODY

BACKGROUND OF THE INVENTION

The present invention concerns that of a new and improved four-wheeled vehicle with a motorcycle body that allows the motorcycle body to be fixedly attached to metallic frame that includes a quartet of tires.

DESCRIPTION OF THE PRIOR ART

U.S. Pat. No. 4,787,647, issued on Nov. 29, 1988 to Oh, discloses a four-wheeled vehicle that has a seat on a pipe-formed body.

U.S. Pat. No. 1,502,303, issued on Jul. 22, 1924 to Gabke, discloses a steering device which is particularly adapted for use on a pedacycle.

U.S. Pat. No. 6,203,043, issued on Mar. 20, 2001 to Lehman, discloses a semi-recumbent, human-powered, four wheel cycle that includes an independent front suspension and wheels that are turned.

U.S. Pat. No. 5,505,493, issued on Apr. 9, 1996 to Camfield et al., discloses a bicycle with simulated motorcycle parts that includes a shroud attachable to the bicycle.

U.S. Pat. No. 1,758,957, issued on May 20, 1920 to McKay, discloses an improvement in vehicles.

SUMMARY OF THE INVENTION

The present invention concerns that of a new and improved four-wheeled vehicle with a motorcycle body that allows the motorcycle body to be fixedly attached to metallic frame that includes a quartet of tires. The vehicle includes a metallic frame that has four "off-road" type tires attached to it. The vehicle also includes a motorcycle body which is essentially a motorcycle with the two tires stripped off of the body. The motorcycle body can be fixedly attached to the frame of the vehicle and can be connected to the drive train of the vehicle, allowing the engine on the motorcycle body to manipulate the drive train of the vehicle into turning the rear axle of the vehicle, thereby propelling the vehicle.

There has thus been outlined, rather broadly, the more important features of a four-wheeled vehicle with a motorcycle body that the detailed description thereof that follows may be better understood and in order that the present contribution to the art may be better appreciated. There are, of course, additional features of the four-wheeled vehicle with a motorcycle body that will be described hereinafter and which will form the subject matter of the claims appended hereto.

In this respect, before explaining at least one embodiment of the four-wheeled vehicle with a motorcycle body in detail, it is to be understood that the four-wheeled vehicle with a motorcycle body is not limited in its application to the details of construction and to the arrangements of the components set forth in the following description or illustrated in the drawings. The four-wheeled vehicle with a motorcycle body is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present four-wheeled vehicle with a motorcycle body. It is important, therefore, that the claims be regarded as including such equivalent constructions insofar as they do not depart from the spirit and scope of the present invention.

It is therefore an object of the present invention to provide a four-wheeled vehicle with a motorcycle body which has all of the advantages of the prior art and none of the disadvantages.

It is another object of the present invention to provide a four-wheeled vehicle with a motorcycle body which may be easily and efficiently manufactured and marketed.

It is another object of the present invention to provide a four-wheeled vehicle with a motorcycle body which is of durable and reliable construction.

It is yet another object of the present invention to provide a four-wheeled vehicle with a motorcycle body which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
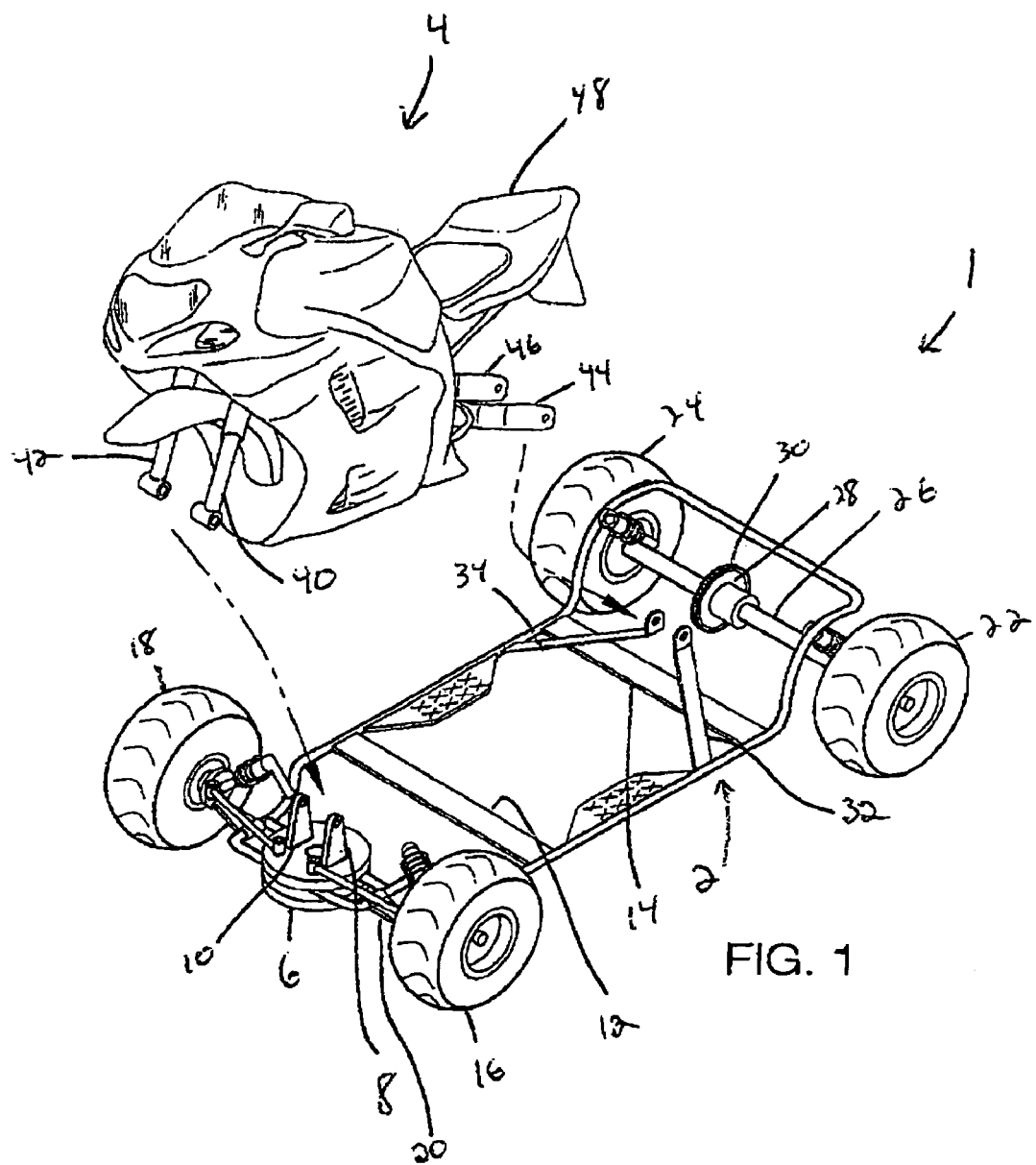
FIG. 1 shows a front perspective view of the frame and motorcycle body of the vehicle as they appear separated from one another.
Figure 2:
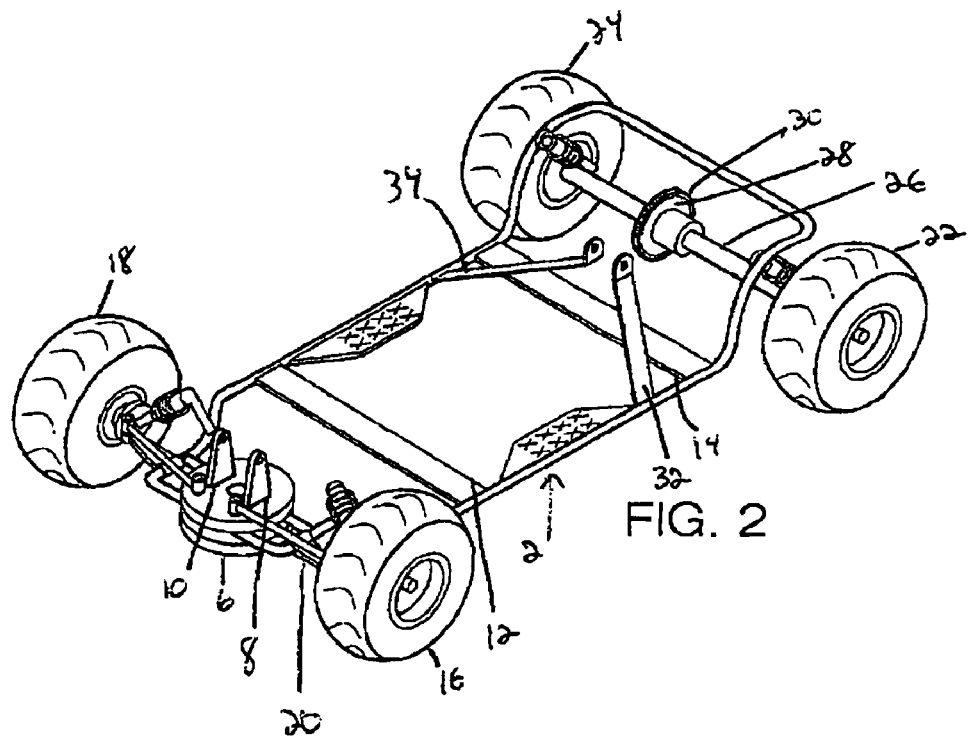
FIG. 2 shows a front perspective view of the frame of the vehicle.
Figure 3:
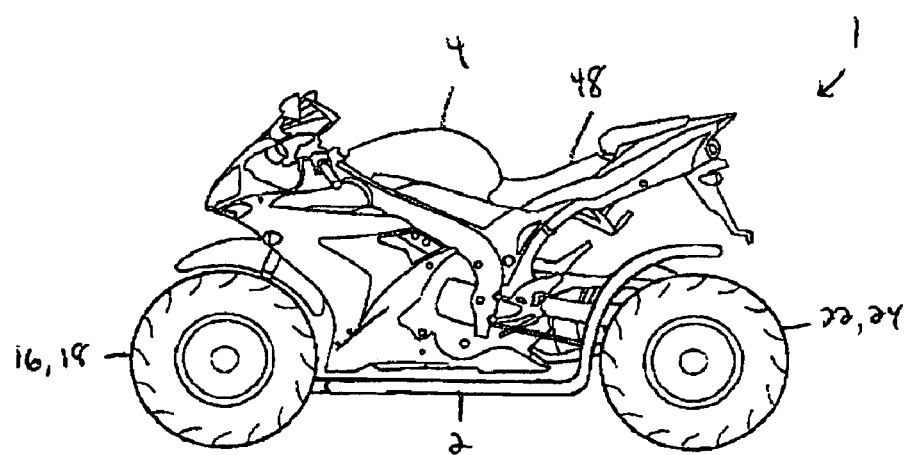
FIG. 3 shows a side view of the frame and the motorcycle body of the vehicle after the motorcycle body has been fixedly connected to the frame.
Figure 4:
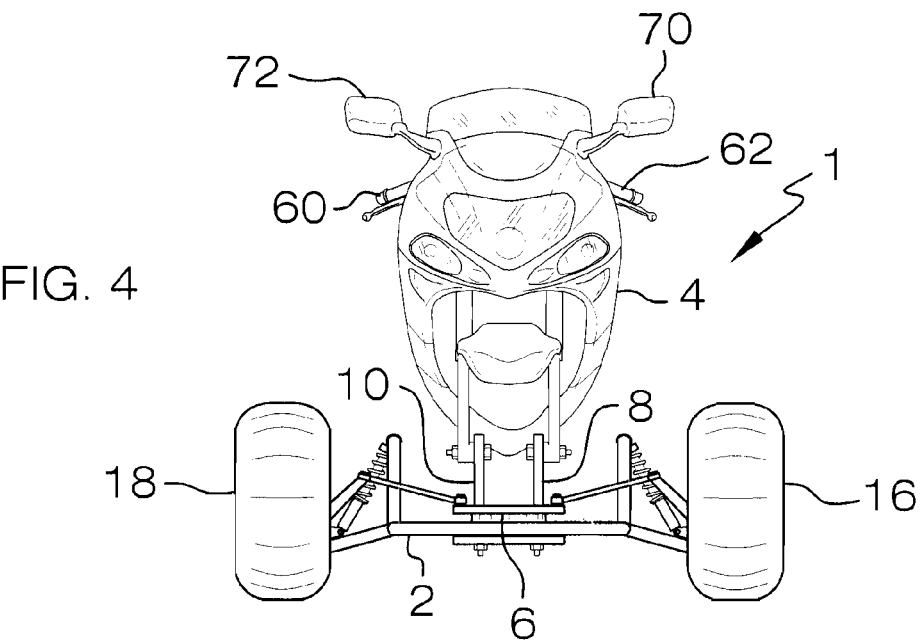
FIG. 4 shows a front end view of the frame and the motorcycle body of the vehicle after the motorcycle body has been fixedly connected to the frame.
Figure 5:
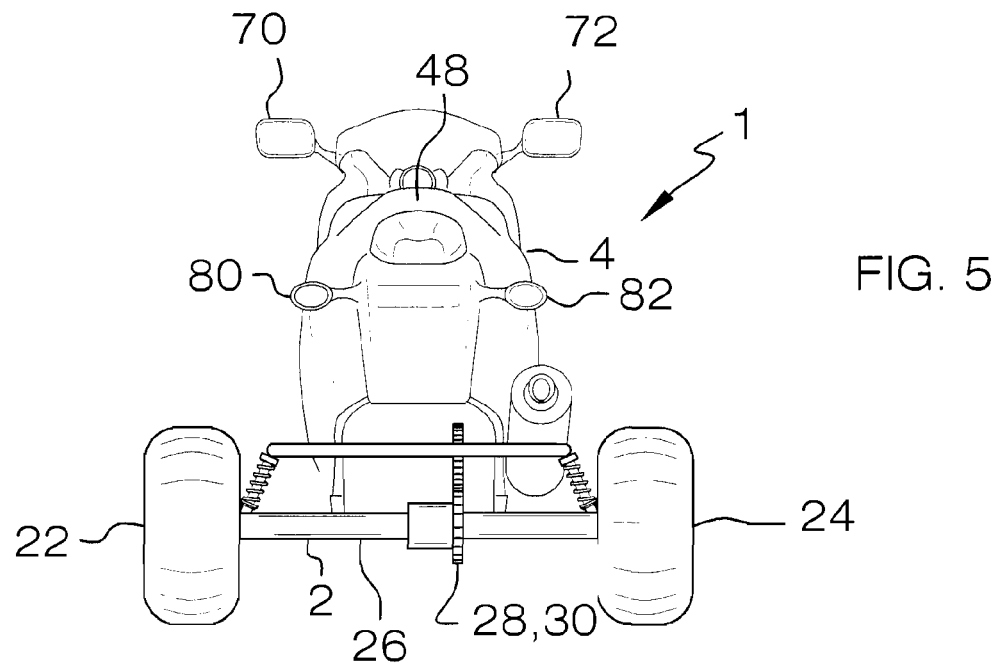
FIG. 5 shows a rear end view of the frame and the motorcycle body of the vehicle after the motorcycle body has been fixedly connected to the frame.
Figure 6:
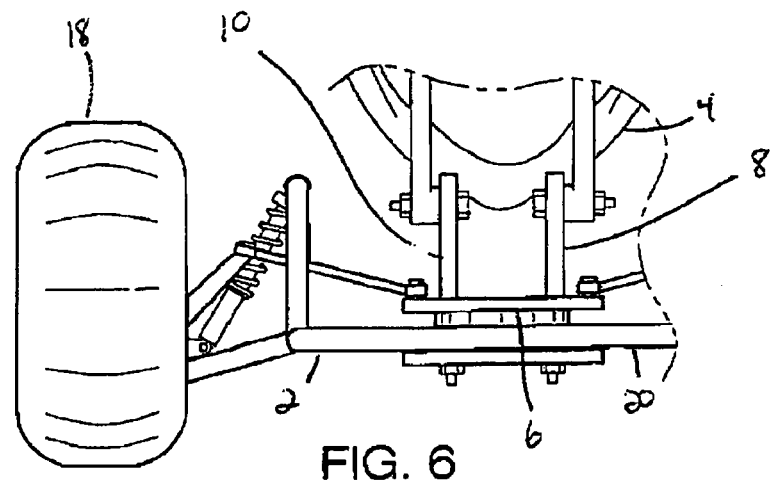
FIG. 6 shows a close-up front end view of the frame and the motorcycle body of the vehicle after the motorcycle body has been fixedly connected to the frame.
Figure 7:
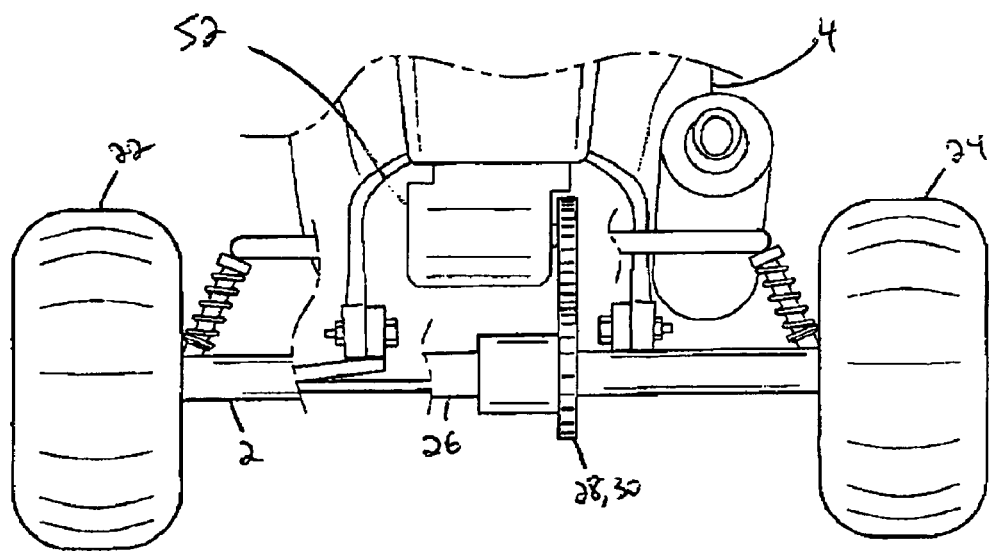
FIG. 7 shows a close-up rear end view of the frame and the motorcycle body of the vehicle after the motorcycle body has been fixedly connected to the frame.
Figure 8:
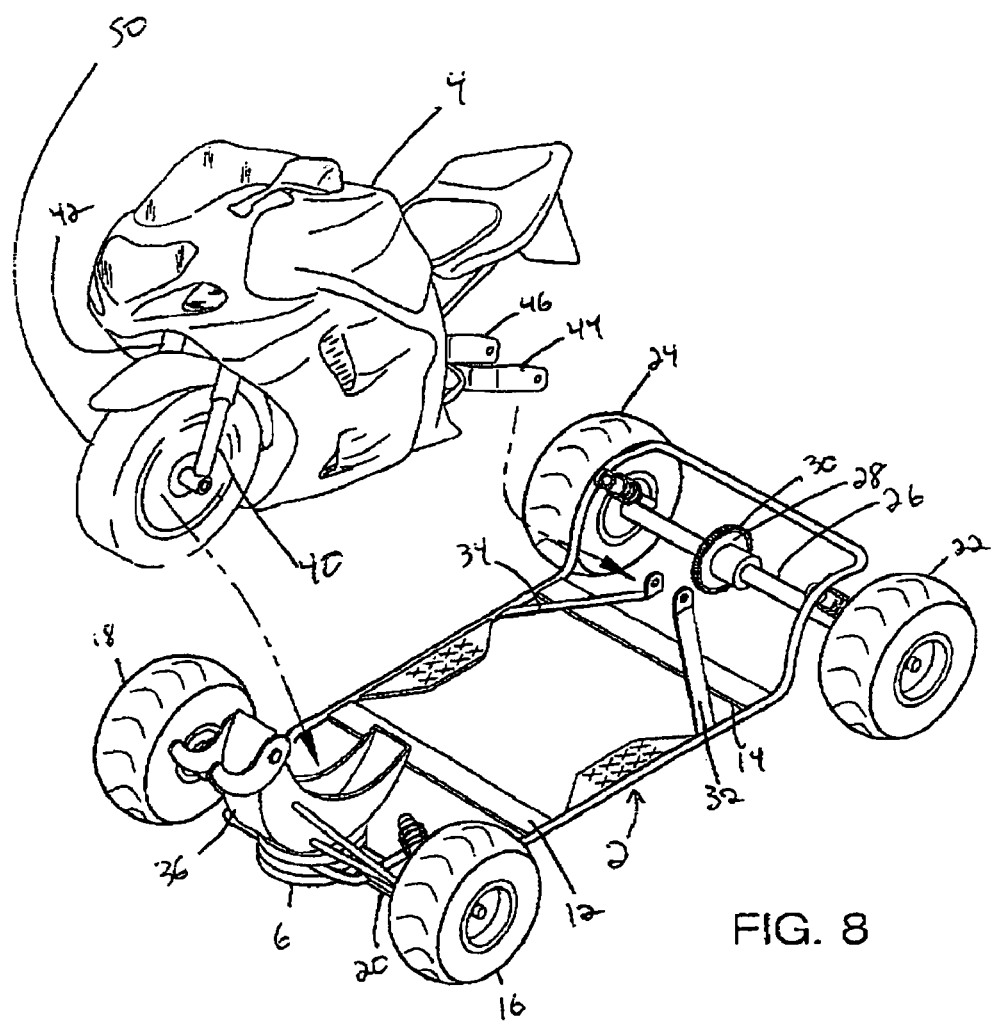
FIG. 8 highlights an alternative embodiment of the present invention and shows a front perspective view of the frame and motorcycle body of the alternative embodiment of the vehicle as they appear separated from one another.

With reference now to the drawings, and in particular to FIGS. 1 through 8 thereof, a new vehicle embodying the principles and concepts of the present invention and generally designated by the reference numeral 1 will be described.

As best illustrated in FIGS. 1 through 8, the vehicle 1 comprises a rigid metallic frame 2 that can be fabricated from a wide variety of metals. However, aluminum is preferred in fabricating the metallic frame 2. The frame 2 itself further comprises a pair of cross members 12 and 14 that provide extra structural support to the frame 2.

Attached to the frame 2 is a mounting plate 6, to which is attached a pair of front mounting posts 8 and 10. Furthermore, swing arm 20 is attached to the frame 2, with the swing arm 20 having two ends, a left end and a right end. Left front wheel 16 is attached to the left end of the swing arm 20, while right front wheel 18 is attached to the right end of the swing arm 20. Wheels 16 and 18 can be any variety of wheel but preferably are of the "off road" variety.

The frame 2 further comprises a rear axle 26, with the rear axle 26 having two ends, a left end and a right end. Left rear tire 22 is attached to the left end of the rear axle 26, while right rear tire 24 is attached to the right end of the rear axle 26. Wheels 22 and 24 can be any variety of wheel but preferably are of the "off road" variety.

Attached to the rear axle is a sprocket 28, with the sprocket having an attached chain 30. The chain 30 can be attached to a motorcycle body 4 that is mounted on the frame 2.

The vehicle 1 further comprises a motorcycle body 4 that can be fixedly mounted on the frame 4. The motorcycle body 4 has a pair of front attachments 40 and 42, with front attachment 40 being fixedly attached to the mounting post 8 and front attachment 42 being fixedly attached to the mounting post 10.

Vehicle 1 further comprises rear mounting posts 32 and 34, which are metal bars that extend upward from the frame 2 of the vehicle 1. Mounting post 32 is capable of being fixedly attached to left rear attachment 44 on motorcycle body 4, while mounting post 34 is capable of being fixedly attached to right rear attachment 46 on motorcycle body 4.

Motorcycle body 4 has a seat 48 that allows an individual to sit on when utilizing the vehicle 1. Furthermore, once the motorcycle body 4 is properly mounted on the frame 2, the chain 30 and sprocket 28 are connected to the transmission 52 on the motorcycle body 4, allowing the engine 54 on the motorcycle body 4 to power the transmission 52 and propel the vehicle 1 forward.

Motorcycle body 4 further comprises a pair of handlebars 60 and 62 that allow an individual to properly grasp the motorcycle body 4 when it is in use. Furthermore, motorcycle body 4 includes a pair of rear view mirrors 70 and 72 and a set of taillights 80 and 82.

In an alternative version of the present invention, mounting posts 8 and 10 are not present. Rather, a wheel holder 36 is mounted on the mounting plate 6 and the front wheel 50 on the motorcycle body 4 is left in place. Once the motorcycle body 4 is placed on the frame 2 and the rear mounting posts 32 and 34 are fixedly attached to the rear attachments 44 and 46, the front wheel 50 can be placed within the wheel holder 36.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim as my invention is:

1. A vehicle comprising:
    a metallic frame,
    a quartet of wheels attached to the metallic frame, the quartet of wheels comprising a left front wheel, a right front wheel, a left rear wheel, and a right rear wheel,
    a motorcycle body fixedly attached to the frame, and
    a mounting plate disposed midway between the left front wheel and the right front wheel,
    wherein the vehicle further comprises a pair of front mounting posts attached to the mounting plate, the pair of mounting posts comprising a left front mounting post and a right front mounting post,
    wherein the vehicle further comprises at least two cross members, the cross members being attached to the metallic frame,
    wherein the vehicle further comprises:
        a left swing arm having two ends, a left end and a right end, the left swing arm being attached to the metallic frame,
        a right swing arm having two ends, a left end and a right end, the right swing arm being attached to the metallic frame,
        a rear axle having two ends, a left end and a right end, the rear axle being attached to the metallic frame,
        wherein the left front wheel is attached to the left end of the left swing arm,
        further wherein the right front wheel is attached to the right end of the right swing arm,
        further wherein the left rear wheel is attached to the left end of the rear axle, and
        further wherein the right rear wheel is attached to the right end of the rear axle.

2. A vehicle according to claim 1 wherein the vehicle further comprises a sprocket attached to the rear axle.

3. A vehicle according to claim 2 wherein the vehicle further comprises a pair of rear mounting posts comprising a left rear mounting post and a right rear mounting post, wherein each of the mounting posts are connected to the frame, further wherein each of the mounting post extends upward from the frame.

4. A vehicle according to claim 3 wherein the body further comprises
    (a) a pair of front attachments comprising a left front attachment and a right front attachment,
    (b) a pair of rear attachments comprising a left rear attachment and a right rear attachment,
    (c) wherein the left front attachment is fixedly attached to the left mounting post, and
    (d) further wherein the right front attachment is fixedly attached to the right mounting post, and
    (e) further wherein the left rear attachment is fixedly attached to the left rear mounting post, and
    (f) further wherein the right rear attachment is fixedly attached to the right rear mounting post.

5. A vehicle according to claim 4 wherein the body further comprises a seat.

6. A vehicle according to claim 5 wherein the body further comprises a transmission attached to the body.

7. A vehicle according to claim 6 wherein the body further comprises a pair of handlebars, the pair of handlebars comprising a first handlebar and a second handlebar.

8. A vehicle according to claim 7 wherein the body further comprises a pair of rear view mirrors.

9. A vehicle according to claim 8 wherein the body further comprises a pair of taillights.

* * * * *